United States Patent [19]

Hagiwara et al.

[11] Patent Number: 5,457,153

[45] Date of Patent: Oct. 10, 1995

[54] LIQUID COATING COMPOSITION

[75] Inventors: Yoshio Hagiwara, Tokyo; Isao Satoh, Kanagawa; Hatsuyuki Tanaka, Kanagawa; Toshimasa Nakayama, Kanagawa, all of Japan

[73] Assignee: Tokyo Ohka Kogyo Co., Ltd., Japan

[21] Appl. No.: 289,032

[22] Filed: Aug. 11, 1994

[30] Foreign Application Priority Data

Aug. 12, 1993 [JP] Japan .................... 5-200892

[51] Int. Cl.$^6$ ............... C08K 5/02; C08L 27/14
[52] U.S. Cl. ............. 524/462; 524/220; 524/221; 524/224; 524/557; 524/560; 524/803; 524/805
[58] Field of Search ............... 524/557, 560, 524/803, 805, 220, 221, 224, 462

[56] References Cited

U.S. PATENT DOCUMENTS 4,183,837  1/1980  Tamura et al. ............... 524/205
4,802,740  2/1989  Hotta et al. ............... 525/61

FOREIGN PATENT DOCUMENTS 1-121802  5/1989  Japan .
5-127377  5/1993  Japan .

*Primary Examiner*—Paul R. Michl
*Assistant Examiner*—Olga Asinovsky
*Attorney, Agent, or Firm*—Wenderoth, Lind & Ponack

[57] ABSTRACT

Proposed is an aqueous coating composition based on a polyvinyl alcohol suitable for use to provide a protective film on various electronic materials. The composition comprises, as dissolved in water, a partially saponified polyvinyl alcohol having a specified average degree of polymerization and a specified degree of saponification, a fluorine-containing surface active agent and, optionally, a quaternary ammonium hydroxide. The liquid coating composition is preferably freed from sodium ions as an impurity by an ion-exchange treatment.

4 Claims, No Drawings

LIQUID COATING COMPOSITION

BACKGROUND OF THE INVENTION

The present invention relates to a liquid coating composition or, more particularly, to an aqueous coating composition suitable for use to form a coating film on various kinds of electronic parts such as an oxygen-shielding coating film on various kinds of resist layers, coating film for preventing deposition of glass dust particles on liquid crystal display devices when the glass substrate thereof is cut for trimming, coating film for preventing degradation of the pattern configuration in a positive-working photoresist layer for the patterning irradiation with excimer laser beams and so on.

Liquid crystal display panels for exhibition of colored images are widely used in recent years in compact-size television sets, instrument panels on the dashboard of automobiles and airplanes and the like. According to this trend, the demand for color filters is rapidly growing as an essential part of liquid crystal color display panels. Known methods for the preparation of color filters include the dyeing method, printing method, pigment dispersion method and the like, of which the last mentioned pigment dispersion method is highlighted industrially in view of the economical advantage. This pigment dispersion method consists of the steps including formation of a light-shielding film on a substrate plate, coating thereof with a colored resist composition and an oxygen-shielding film and pattern-wise exposure thereof to light through a photomask followed by a development treatment, this sequence of steps being repeated three times for the respective primary colors of red, green and blue to form a three-colored patterned resist layer. While the most conventional material for the above mentioned oxygen-shielding film is a polyvinyl alcohol, the patterned resist layer formed by using a polyvinyl alcohol has a problem that the cross sectional profile of a line pattern has an inversely or upwardly broadening trapezoidal configuration so that, when an undercoat levelling layer or an insulating layer is formed on the patterned resist layer, an unfilled space is sometimes formed between the patterned resist layer and the undercoat levelling layer or the insulating layer eventually resulting in image line defects or incomplete electrical connection consequently to lead to a decrease in the quality of liquid crystal devices.

SUMMARY OF THE INVENTION

The present invention accordingly has an object, by overcoming the above described problems and disadvantages in the pigment dispersion method in the prior art, to provide a novel and improved liquid coating composition capable of giving a patterned resist layer of which the cross sectional profile has an orthogonal or trapezoidal configuration without leaving an unfilled space between the patterned resist layer and an undercoat levelling layer or an insulating layer formed thereon.

Thus, the liquid coating composition of the invention comprises, as a uniform solution:

(a) 100 parts by weight of a partially saponified polyvinyl alcohol having an average degree of polymerization of 300 to 700 and a degree of saponification of 86.5 to 89.0%;

(b) from 0.1 to 20 parts by weight of a fluorine-containing surface active agent; and (c) a liquid medium to dissolve the components (a) and (b) which is water or a liquid mixture mainly composed of water, the content of sodium ions in the composition being 0.1 ppm by weight or smaller.

In addition to the above described essential ingredients, it is preferable that the liquid coating composition of the invention is further admixed with (d) a quaternary ammonium compound in an amount in the range from 0.5 to 20 parts by weight per 100 parts by weight of the partially saponified polyvinyl alcohol as the component (a).

DETAILED DESCRIPTION OF THE PREFERRED EMBODIMENTS

As is described above, the principal ingredients in the inventive liquid coating composition include a partially saponified polyvinyl alcohol having a specified average degree of polymerization and a specified degree of saponification as the component (a) and a fluorine-containing surface active agent as the component (b) which are uniformly dissolved in an aqueous medium as the component (c). The partially saponified polyvinyl alcohol is a partial saponification product of a polyvinyl acetate.

Use of a polyvinyl alcohol is not new as a material of the protecting film or an oxygen-shielding film in the manufacture of color filters. For example, U.S. Pat. No. 4,802,740 discloses use of an aqueous solution containing a polyvinyl alcohol having an average degree of polymerization of 1000 to 3000 and a degree of saponification of at least 98% as a film-forming ingredient in combination with a titanium alkoxide as a liquid coating composition for the formation of a film which serves for protection of the substrate surface and for orientation control. Further, Japanese Patent Kokai 1-121802 discloses a method for the preparation of a color filter by using a polyvinyl alcohol as an oxygen-shielding film although the disclosure does not specify the average degree of polymerization and degree of saponification of the polyvinyl alcohol. In contrast thereto, it has been unexpectedly discovered that a great improvement can be obtained in a polyvinyl alcohol-based liquid coating composition when the polyvinyl alcohol has an average degree of polymerization of 300 to 700 and a degree of saponification of 86.5% to 89.0%. Several grades of commercial products satisfying these requirements are available on the market including those sold in Japan under the trade names of Gosenols by Nippon Gosei Kagaku Kogyo Co., Shin-Etsu Povals by Shin-Etsu Chemical Co., Unitika Povals by Unitika Co. and Kuraray Povals by Kuraray Co. as well as various polyvinyl alcohol products available in other countries. It is of course that polyvinyl alcohols having a higher degree of saponification can also be used for the purpose when the average degree of polymerization is in the range from 300 to 700 but such a polyvinyl alcohol is undesirable because the aqueous solution of such a high-saponification polyvinyl alcohol is relatively unstable eventually to cause gelation of the solution with poor storage stability.

In the preparation of the liquid coating composition of the invention, the partially saponified polyvinyl alcohol is dissolved in water in an amount in the range from 3 to 10 times or, preferably, from 5 to 10 times by weight based on the amount thereof. The aqueous solution of the polyvinyl alcohol is preferably subjected to a purification treatment by ion exchange using an cation-exchange resin to remove alkali metal ions as completely as possible. It is desirable that the content of sodium ions is decreased not to exceed 0.1 ppm or, preferably, 0.05 ppm by weight. Removal of alkali metal ions has an effect to further increase the storage stability of the liquid coating composition of the invention.

The cation-exchange resin used here is typically a sulfonated crosslinked copolymeric resin of styrene and divinyl benzene and various commercial products of strongly acidic cation-exchange resins are available including those sold under the trade names of Amberlites IR-120B, IR-118H, IR-122 and IR-124 manufactured and sold by Organo Co., of which Amberlite IR-120B is preferred.

The component (b) as the other essential ingredient in the inventive liquid composition is a fluorine-containing surface active agent which is selected from salts and amides of perfluorinated carboxylic acid as well as N-substituted derivatives thereof, salts and amides of perfluorinated sulfonic acid as well as N-substituted derivatives thereof, perfluorinated aliphatic alcohols and ethylene oxide adducts of these perfluorinated compounds. Particularly preferable fluorine-containing surface active agents among the above include those represented by the general formula $$Rf-A-NR-(C_2H_4O)_n-H,$$

in which A is a divalent group of $-SO_2-$ or $-CO-$, Rf is a perfluoroalkyl group having 6 to 10 carbon atoms such as perfluorohexyl and perfluorooctyl groups, R is an alkyl group having 1 to 4 carbon atoms and the subscript n is an integer of 1 to 20 or, preferably, 10 or larger in respect of the solubility in water. Various commercial products belonging to this class are available from Tohoku Hiryo Co. under the trade names of Eftops EF 112, EF 122A, EF 122B and EF 122C, in which the subscript n has a value of 1, 20, 10 and 3, respectively.

The amount of the fluorine-containing surface active agent as the component (b) in the inventive liquid composition is in the range from 0.1 to 20 parts by weight or, preferably, from 0.5 to 15 parts by weight per 100 parts by weight of the partially saponified polyvinyl alcohol as the component (a).

As is described before, the liquid coating composition of the invention is preferably further admixed with a quaternary ammonium compound as the component (d), which is represented by the general formula $$(R^1R^2R^3R^4N)^+X^-,$$

in which $R^1$, $R^2$, $R^3$ and $R^4$ are, each independently from the others, an alkyl group having 1 to 4 carbon atoms or hydroxyalkyl group having 2 to 4 carbon atoms and $X^-$ is an anionic residue. The alkyl or hydroxyalkyl groups denoted by $R^1$ to $R^4$ are exemplified by methyl, ethyl, propyl and butyl groups and 2-hydroxy ethyl, 3-hydroxy propyl and 4-hydroxy butyl groups. The anionic residue denoted by $X^-$ is exemplified by hydroxy ion and inorganic and organic acid residues such as halogen ions, sulfate ion, nitrate ion, oxalate ion and acetate ion, of which hydroxy ion is particularly preferred.

Examples of suitable quaternary ammonium compounds include tetramethyl ammonium hydroxide, tetraethyl ammonium hydroxide, trimethyl 2-hydroxyethyl ammonium hydroxide, triethyl 2-hydroxyethyl ammonium hydroxide and the like. When a quaternary ammonium compound as the component (d) is added to the liquid coating composition of the invention, the amount thereof is in the range from 0.5 to 20 parts by weight or, preferably, from 0.5 to 5 parts by weight per 100 parts by weight of the partially saponified polyvinyl alcohol as the component (a).

The liquid coating composition of the invention can be prepared by uniformly admixing an aqueous solution of a partially saponified polyvinyl alcohol, preferably, after an ion exchange treatment to remove metallic ions with a fluorine-containing surface active agent as the component (b) and, optionally, a quaternary ammonium compound as the component (d), which is conveniently admixed with the liquid composition in the form of an aqueous solution of 1 to 10% by weight concentration. It is preferable that, when the quaternary ammonium compound is used, it is added to the aqueous solution of the polyvinyl alcohol prior to the addition of the fluorine-containing surface active agent.

The liquid coating composition of the invention prepared in the above described manner has excellent storage stability and can be used in various applications. For example, an oxygen-shielding film can be formed on the resist layer of an acrylic resin-based photopolymerizable resin composition in the manufacture of liquid crystal display devices to ensure an orthogonal or trapezoidal cross sectional profile of the patterned resist layer so that no unfilled space is left between the patterned resist layer and an undercoat levelling layer or an insulating layer formed thereon. Further, the coating composition is useful for forming a film to prevent deposition of glass dust particles in cutting and trimming of various kinds of glass plate-based electronic devices and a film to prevent pattern form degradation in a positive-working photoresist composition by excimer laser irradiation.

In the following, the liquid coating composition of the invention is illustrated in more detail by way of examples and comparative examples, in which the term of "parts" always refers to "parts by weight". The liquid coating compositions prepared in the following examples and comparative examples were evaluated for the following items by the testing procedures respectively described there.

(1) Cross sectional profile of patterned resist layer

The cross section of a patterned resist layer was examined on a scanning electron microscopic photograph and the cross sectional profile was recorded in three ratings of A for a trapezoidal profile, B for an orthogonal profile and C for an inversely trapezoidal profile.

(2) Unfilled space between a patterned resist layer and an insulating layer thereon A patterned resist layer formed on a substrate was coated with a liquid coating composition for an insulating layer containing an acrylic epoxy resin (Optomer, a product by Japan Synthetic Rubber Co.) followed by drying and the cross section was examined on a scanning electron microscopic photograph. The cross sectional profile was recorded in two ratings Good and Poor for absence and presence of an unfilled space, respectively.

(3) Spreadability of coating layer

A glass substrate plate having a color resist layer before patterning was coated with the inventive or comparative liquid coating composition on a spinner and the condition of the coating layer was visually examined to record the results as Good when no unevenness was found in the coating layer and Poor when unevenness in the coating layer or repellency on the substrate surface was found.

(4) Storage stability

The liquid coating composition was kept at room temperature in a hermetically sealed container for up to 12 months at room temperature to record the results in three ratings A when no foreign matters were found in the liquid after 12 months, B when foreign matters were not found after 3 months but found after 12 months and C when foreign matters were found already by storage for 3 months.

EXAMPLE 1

An aqueous solution was prepared by dissolving 10 parts of a partially saponified polyvinyl alcohol having an average degree of polymerization of about 300 and a degree of saponification of 87.6% (Gosenol, a product by Nippon Gosei Kagaku Co.) in 90 parts of water. This aqueous solution was passed through a column filled with a cation-exchange resin in an acid form (Amberlite IR 120B, a product by Organo Co.) to remove the metallic ions. The aqueous solution after this ion-exchange treatment contained 20 ppb by weight of sodium ions and 25 ppb by weight of potassium ions while the contents of sodium ions and potassium ions before the ion-exchange treatment were 110 ppm by weight and 50 ppm by weight, respectively.

The aqueous solution of polyvinyl alcohol after the ion-exchange treatment was admixed with 15 parts of a 2.38% by weight aqueous solution of tetramethyl ammonium hydroxide and 0.75 part of a fluorine-containing surface active agent (EF 122A, supra) expressed by the structural formula $$C_8F_{17}-SO_2-NR-(C_2H_4O)_{20}-H,$$

to prepare a liquid coating composition.

Separately, a glass substrate plate was coated with a photosensitive resin composition prepared by uniformly mixing together:

15 parts of a copolymer of methacrylic acid and methyl methacrylate in a weight ratio of 25:75 having a weight-average molecular weight of 25000 as a polymeric binder;

9 parts of trimethylolpropane triacrylate as a polymerizable compound;

each 2 parts of 2-benzyl-2-dimethylamino--(4-morpholinophenyl)butane-one (Irgacure 369, a product by Ciba-Geigy Co.) and diethyl thioxanthone as photopolymerization initiators;

20 parts of a green pigment (Lyonol Green 2Y-301, a product by Toyo Ink Manufacturing Co.); and 45 parts and 10 parts of 3-methyl-3-methoxybutyl acetate and ethyleneglycol monomethyl ether, respectively, as solvents, by using a reverse coater (Round Coater, manufactured by Dai-Nippon Screen Co.) followed by drying to form a photoresist layer and then further coated with the above prepared liquid coating composition to form an overcoating layer. Thereafter, the photoresist layer was exposed pattern-wise to ultraviolet light in a dose of 100 mJ/cm² through a pattern-bearing photomask followed by a development treatment with a 0.5% by weight aqueous solution of sodium carbonate at 25° C. for 1 minute.

Evaluation tests were undertaken of the liquid coating composition and the patterned resist layer for the above mentioned items to give the results shown in Table 1 below.

EXAMPLE 2

The experimental procedure was substantially the same as in Example 1 excepting replacement of the partially saponified polyvinyl alcohol with another partially saponified polyvinyl alcohol having an average degree of polymerization of about 400 and a degree of saponification of 87.2% (Kuraray Poval, a product by Kuraray Co.) and omission of addition of tetramethyl ammonium hydroxide.

The results of the evaluation tests are shown in Table 1.

Comparative Example 1

The experimental procedure was substantially the same as in Example 1 except that the aqueous solution of the partially saponified polyvinyl alcohol was used without the ion-exchange treatment and the fluorine-containing surface active agent and the aqueous solution of tetramethyl ammonium hydroxide were omitted in the formulation. The contents of sodium and potassium ions in the liquid coating composition were 110 ppm by weight and 50 ppm by weight, respectively.

The results of the evaluation tests are shown in Table 1.

Comparative Example 2

The experimental procedure was substantially the same as in Example 1 excepting omission of the fluorine-containing surface active agent in the formulation of the liquid coating composition.

The results of the evaluation tests are shown in Table 1.

TABLE 1

|  | Cross sectional profile | Unfilled space | Spreadability | Storage stability |
|---|---|---|---|---|
| Example 1 | A | Good | Good | B |
| Example 2 | B | Good | Good | A |
| Comparative Example 1 | C | Poor | Poor | C |
| Comparative Example 2 | C | Poor | Poor | B |

What is claimed is:

1. A liquid coating composition which comprises, as a uniform solution:

(a) 100 parts by weight of a partially saponified polyvinyl alcohol having an average degree of polymerization of 300 to 700 and a degree of saponification of 86.5 to 89.0%;

(b) from 0.1 to 20 parts by weight of a fluorine-containing surface active agent represented by the formula:

$$Rf-A-NR-(C_2H_4O)_n-H),$$

in which A is a divalent group of $-SO_2-$ or $-CO-$, Rf is a perfluoroalkyl group having 6 to 10 carbon atoms, R is an alkyl group having 1 to 4 carbon atoms and the subscript n is an integer of 1 to 20; and (c) a liquid medium to dissolve the components (a) and (b), which is water or a liquid mixture mainly composed of water, the content of sodium ions in the coating composition being 0.1 ppm by weight or smaller.

2. A liquid coating composition which comprises, as a uniform solution:

(A) 100 parts by weight of a partially saponified polyvinyl alcohol having an average degree of polymerization of 300 to 700 and a degree of saponification of 86.5 to 89.0%;

(B) from 0.1 to 20 parts by weight of a fluorine-containing surface active agent;

(C) from 0.5 to 20 parts by weight of a quaternary ammonium compound; and (D) a liquid medium to dissolve the components (A), (B) and (C), which is water or a liquid mixture mainly composed of water, the content of sodium ions in the coating composition being 0.1 ppm by weight or smaller.

3. The liquid coating composition as claimed in claim 2 in which the quaternary ammonium compound is a quaternary ammonium hydroxide.

4. The liquid coating composition as claimed in claim 2 in which the fluorine-containing surface active agent is represented by the formula:

$$Rf-A-NR-(C_2H_4O)_n-H,$$

in which A is a divalent group of $-SO_2-$ or $-CO-$, Rf is a perfluoroalkyl group having 6 to 10 carbon atoms, R is an alkyl group having 1 to 4 carbon atoms and the subscript n is an integer of 1 to 20.

* * * * *